US009781563B2

(12) United States Patent
Mahajan et al.

(10) Patent No.: US 9,781,563 B2
(45) Date of Patent: Oct. 3, 2017

(54) SYSTEM AND METHOD FOR DETERMINING A SPECIFIC USER LOCATION AND A PATH TO AN EXIT

(71) Applicants: Vinay Mahajan, West Windsor, NJ (US); Christian Navarro, Bayonne, NJ (US); Trisha Mahajan, Bayonne, NJ (US)

(72) Inventors: Vinay Mahajan, West Windsor, NJ (US); Christian Navarro, Bayonne, NJ (US); Trisha Mahajan, Bayonne, NJ (US)

( * ) Notice: Subject to any disclaimer, the term of this patent is extended or adjusted under 35 U.S.C. 154(b) by 0 days.

(21) Appl. No.: 14/976,912

(22) Filed: Dec. 21, 2015

(65) Prior Publication Data
US 2016/0183055 A1 Jun. 23, 2016

Related U.S. Application Data

(60) Provisional application No. 62/095,132, filed on Dec. 22, 2014.

(51) Int. Cl.
H04W 4/02 (2009.01)
H04W 4/22 (2009.01)
H04M 11/00 (2006.01)
H04M 3/42 (2006.01)
H04B 1/38 (2015.01)
G06T 11/20 (2006.01)

(52) U.S. Cl.
CPC ........... *H04W 4/023* (2013.01); *H04W 4/025* (2013.01); *H04W 4/22* (2013.01)

(58) Field of Classification Search
CPC ....... H04W 4/023; H04W 4/025; H04W 4/02; H04W 4/22
USPC ......... 455/404.2, 414.1, 414.2, 414.3, 422.1, 455/456.1; 340/539.2, 7.27
See application file for complete search history.

(56) References Cited

U.S. PATENT DOCUMENTS

| 8,213,968 | B1* | 7/2012 | Joseph | G08B 25/10 370/328 |
| 2012/0252401 | A1* | 10/2012 | Rothschild | G08B 25/001 455/404.2 |
| 2014/0354188 | A1* | 12/2014 | Takahashi | H05B 37/0245 315/312 |
| 2015/0087257 | A1* | 3/2015 | Balram | H04W 4/12 455/404.1 |

(Continued)

Primary Examiner — Inder Mehra
(74) Attorney, Agent, or Firm — Dunlap Bennett & Ludwig PLLC

(57) ABSTRACT

A system and method for determining a specific user location and path to an exit during an emergency condition. In response to an emergency alarm activated for a structure, a notification system may receive the alarm signal. The notification system may send a notification of the alert to a user mobile device when the user has subscribed to receive alerts regarding the structure. The notification may determine that the subscribed mobile device is located in the vicinity of the structure and activate an alarm on the device. A distressed user's mobile device may also be configured to transmit a supersonic audio SOS signal to a responder's mobile device. The two devices may establish supersonic communications between the responder and the distressed user devices to provide instructions or guidance to locate the distressed user device.

4 Claims, 4 Drawing Sheets

(56) References Cited

U.S. PATENT DOCUMENTS

| | | | |
|---|---|---|---|
| 2015/0158587 A1* | 6/2015 | Patrick | B64C 39/024 244/137.4 |
| 2015/0317809 A1* | 11/2015 | Chellappan | H04W 4/02 455/404.1 |
| 2015/0373519 A1* | 12/2015 | Bastianelli | H04W 4/22 455/404.1 |
| 2016/0047649 A1* | 2/2016 | Edge | H04W 4/025 455/73 |
| 2016/0123741 A1* | 5/2016 | Mountain | G01C 21/206 701/533 |

* cited by examiner

SYSTEM AND METHOD FOR DETERMINING A SPECIFIC USER LOCATION AND A PATH TO AN EXIT

CROSS-REFERENCE TO RELATED APPLICATION

This application claims the benefit of priority of U.S. provisional application No. 62/095,132, filed Dec. 22, 2014, the contents of which are herein incorporated by reference.

BACKGROUND OF THE INVENTION

The present invention relates to emergency notification and response systems and, more particularly, to providing alerts to an emergency condition and guidance instructions to evacuate the area.

When a fire emergency occurs in a high rise building, it can be very hard to figure out where is the closest path to an exit. Similarly, for a building occupant that may be trapped from exiting the structure, it can be difficult to relay the trapped occupant's location to emergency response personnel.

Both of these circumstances can be especially true if a person may only be a visitor to the building.

As can be seen, there is a need for a method for determining a specific user location during an emergency situation so that the user may receive instructions for evacuating the area in the safest, most expeditious manner. There is also a need for providing location.

As can be seen, there is a need for a system and method for determining a user location within a structure during an emergency situation and providing guidance to the user to be able to safely exit the building.

SUMMARY OF THE INVENTION

In one aspect of the present invention, a method for determining a location and path is disclosed. The method comprises: notifying an automated notification system that an emergency alarm has been triggered at a specified location, the notification system hosted on a server; transmitting a notification from the notification system to a mobile application operating in a non-transitory memory of a mobile device, the notification indicating that the emergency alarm at the specified location has been triggered; triggering the mobile application to activate a device alarm on the mobile device; determining a position of the mobile device within the specified location; providing a map on a display screen on the mobile device, the map corresponding to the determined position of the mobile device; and providing instructions on a path towards an exit within the specified location.

In other aspects of the invention, the step of determining the position of the mobile device within the specified location may further comprise: receiving geographic coordinates of the mobile device; and determining an elevation of the mobile device. The step of determining the elevation of the mobile device may further comprise: receiving a barometric pressure measurement from the mobile device; receiving an atmospheric pressure and a temperature for an area in the vicinity of the specified location; and calculating an estimated elevation of the device at the specified location.

The step of determining the elevation of the mobile device may further comprise: comparing the estimated elevation of the device to a building plan corresponding to the specified location to determine a current floor of the specified location where the device is located. Determining the elevation of the mobile device may also include receiving a GPS altitude signal from the mobile device.

In other aspects of the invention the step of providing the map on the display screen further comprises: providing a map corresponding to the current floor of the specified location. The step of providing instructions on the path towards the exit within the specified location may also include providing instructions on the path from the current floor to the exit.

In certain embodiments of the invention, the step of triggering the mobile application to activate the device alarm occurs after the notification system receives information indicating the mobile device is located in a near proximity of the specified location.

In yet another aspect of the invention, a method of locating a distressed mobile device user is disclosed. The method comprises: receiving a notification of an emergency condition at a specified location on a mobile device located at the specified location; and monitoring for a supersonic audio signal on the mobile device. The method may also include activating a supersonic audio SOS signal on a user interface of the mobile device of the distressed mobile device user; and broadcasting the supersonic audio SOS signal through a device speaker of the distressed mobile device user.

Other aspects of the method may include: receiving an acknowledgement of the supersonic audio SOS signal through a device microphone of the distressed mobile device user; and triggering a human perceptible alarm signal after receiving the acknowledgement. The human perceptible alarm may be an audible alarm or a a visual alarm.

The method of locating a distressed mobile device user may further comprise the steps of detecting a supersonic audio SOS signal on a second mobile device; and broadcasting a supersonic audio acknowledgement of the SOS signal. Other aspects of the method may comprise presenting an audio strength meter on a display screen of the second mobile device. The method may also comprise presenting directional guidance on the display screen of the second mobile device to the source of the supersonic audio SOS signal.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a method for determining a specific location and path comprising: notifying a notification system that a fire alarm has been triggered; pushing a notification to a mobile application on a mobile device; triggering an alarm on the mobile application; providing a map on a screen on the mobile device; and providing instructions on a path towards an exit within a building. As used herein, the system contemplated by the present invention may be referred to as the Smart Application Fire Exit (SAFE).

The present invention may include at least one computer with a user interface. The computer may include any computer including, but not limited to, a desktop, laptop, and smart mobile computing device, such as, a tablet and smart phone. The computer includes a program product including a machine-readable program code for causing, when executed, the computer to perform steps. The program product may include software which may either be loaded onto the computer or accessed by the computer. The loaded software may also include an application on a smart device. The software may be accessed by the computer using a web browser.

Figure 1:
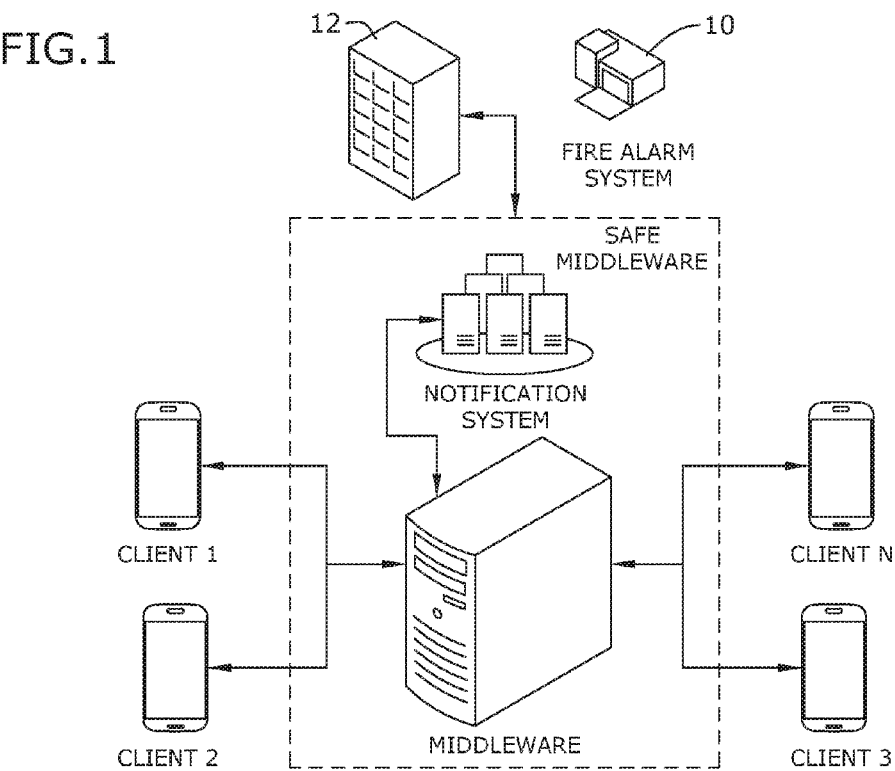
FIG. 1 is a schematic diagram of aspects of the invention.

The computer may access the software via the web browser using the internet, extranet, intranet, host server, internet cloud and the like. As is illustrated in FIG. 1, a representative system architecture is depicted. An embodiment of a method for determining a specific location and path may include accessing a mobile application. A user with a mobile device may download the application. The user may subscribe to receive notifications for the application and for at least one specific building. The mobile application may be connected to at least one fire detection system. The at least one fire detection system may include a fire alarm that may be triggered in the case of a fire emergency. At least one building map may be included with the application.

Hosting Options

The SAFE system will require integration with the building's emergency alarm system. This integration may be done through the use of a middleware component which will relay notifications from the emergency system to the end user devices 16. The SAFE solution may be provided to potential clients with various options, such as to install & host the middleware on premises; or to use middleware hosted in a cloud hosting service, such as Amazon, Google, etc.

The middleware component of the system may also be configured to interact with a messaging system, for example the Apple Push Notification System (APNS), the Google Cloud Messaging (GCM), or like messaging systems. It may also act as a gateway for all notifications coming from the building's alarm system to the user's mobile devices 16.

Login & Registration Module

The first time the application is launched, users 14 will have an option to register. The registration process requires users 14 to enter an ID sent to their email address. Once they have logged into the application, the device will store this information and may keep them logged in going forward. Once the credential are validated, the user 14 lands on the application main screen where they can see which locations or buildings 12 they're currently subscribed to. A subscription to a building 12 means the user 14 will be notified and alerted of any emergencies relating to that building 12 that may be communicated via a fire alarm system 10.

Push Notification Module

Once the user 14 has registered in the system, they will have the ability to subscribe to a building 12 to receive alert notifications. In the background, the SAFE system leverages the Apple Push Notification System to send and receive push notifications on the mobile devices (Client 1-Client N). When a push notification is received, the application retrieves the current floor details and proceeds to take the user directly to the navigation/guidance screen of the floor they are currently on.

Geofencing Module

The SAFE application allows users 14 to subscribe to more than one building 12. For enterprises, this is particularly useful when a company has more than one building 12. It can also be used by users 14 to subscribe to multiple buildings 12 for which they user may want to receive alerts from. The geofencing module makes use of the Apple device GPS and Location Based notification alerts to determine if a user 14 is nearby or close to a specific location 12. The application may monitor when they are in the building 12 or close by. This monitoring allows the system to determine if the user 14 is in any danger at the time of an emergency.

Figure 3:
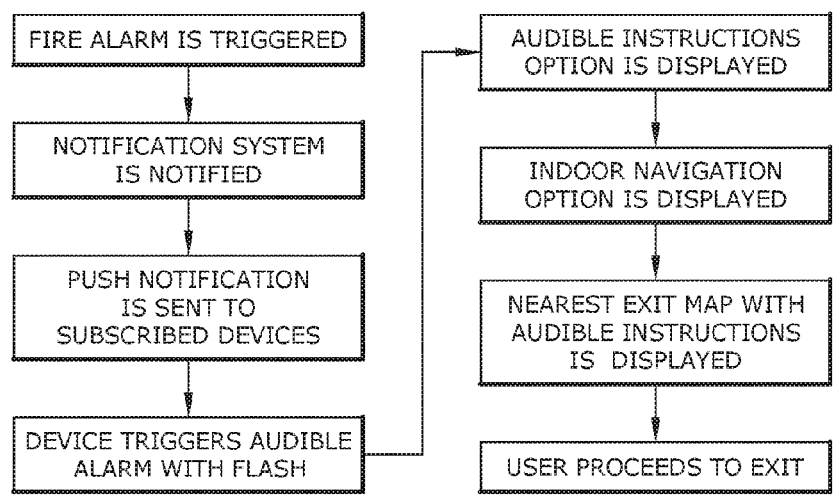
FIG. 3 is a flow chart of an emergency response flow.

A flow chart of the system process is illustrated in reference to FIG. 3. When an emergency alarm 10, such as a fire alarm, is activated, the notification system is notified of the emergency. Responsive to the notification a push notification is sent to all subscribed devices 16. The subscribed devices 16 may be configured to receive an audible alarm, a visual flashing alarm, a vibration, or combination thereof. The alarm will be triggered on devices 16 that have subscribed to the building 12 and may also be limited to devices 16 that are within a geographic vicinity of the subscribed building 12, based on a reported global positioning system (GPS) information reported by the user's device 16. Each of the devices 16 that are subscribed to a building 12 may be polled for their current GPS location, before activating the application alarm on the device.

The subscribed device 16 may display an option for the user 14 to receive audible instructions to accompany a visual indoor navigation display. The instructions may direct the user 14 to the nearest exit via a map or audible instructions. and the user 14 may proceed to the nearest exit.

Floor Plan Integration

The floor plans for each business location 12 may be acquired at the time that the service is agreed with a business building. The information may include: an indoor map for each of the building floors; a highlighted location of FIRE exists; and highlighted emergency routes to nearest exists. For security purposes, the building floor plans may be retained on the system server and may only be communicated to the client devices 16 in the event of an actual emergency condition.

Notification & Navigation System

Figure 2:
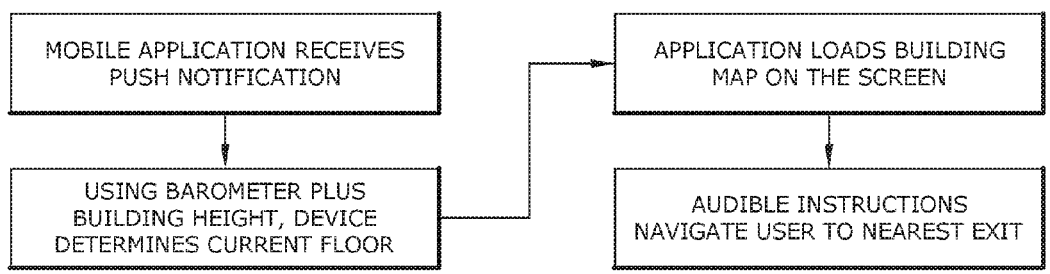
FIG. 2 is a flow chart for providing indoor navigation instructions.

A notification and navigation system is depicted in reference to FIGS. 2 and 3. When an emergency notification is received by the mobile application, the next step is to show the user 14 an interface that will easily allow them to navigate to the nearest exit. The application can provide guidance and navigation in the form of audio in conjunction with a display of visual cues from the user's device 16.

Once the user 14 opens the application, the application may determine the user's current floor location and display the current floor's map. This map may include cues to the let user know the route to the nearest exit(s). The application may also provide audio feedback which can include phrases such as:

"Please remain calm"
"Follow the signs or use the floor map to the nearest exit"
"Please proceed straight ahead"
"Please turn right/left"

Floor Detection Approach

Floor detection is one of the main features of the mobile application. When an emergency notification is received, the user 14 is presented with an option to open up the application. Once the application is opened, it will attempt to use various device components in order to determine the floor the user is currently located on within the building 12.

Figure 5:
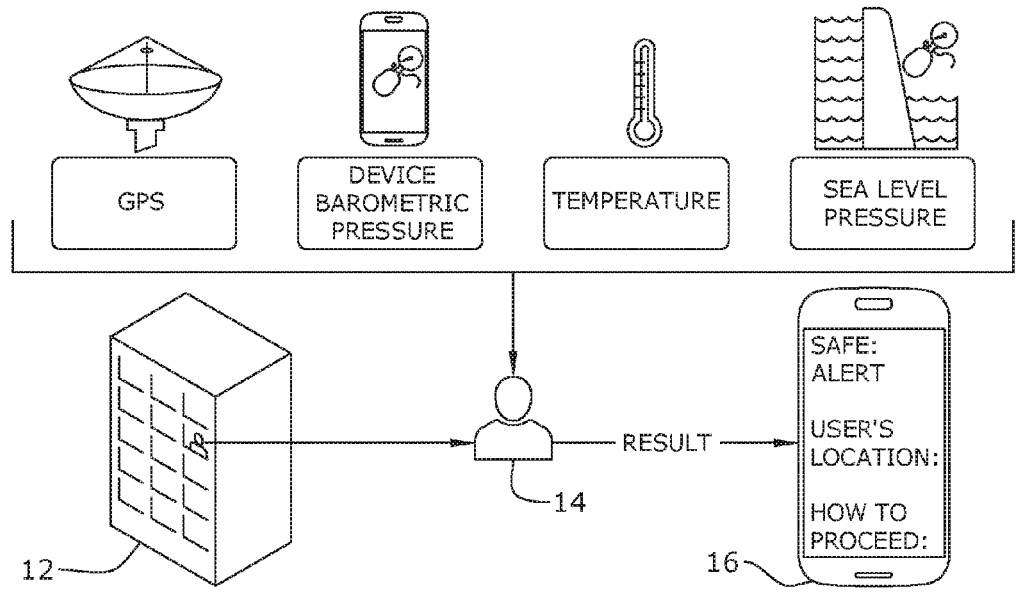
FIG. 5 is a schematic of a floor detection approach.
Figure 6:
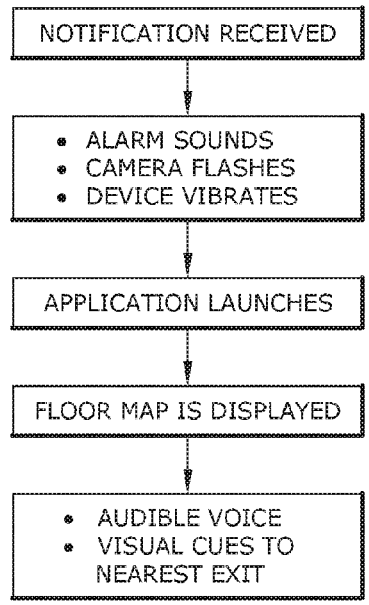
FIG. 6 is a flow chart of the notification and navigation approach.

As seen in reference to FIG. 5, the application may use a barometer and the building height to determine a current floor for the user 14. Once a current floor may be determined, the application may load a building map onto the screen of the mobile device 16. In certain embodiments, a set of audible instructions may be broadcasted from the mobile device 16. The building map may identify the closest exit on the current floor. A visual instruction may also be displayed. An audible instruction may be produced. The user may then follow the instructions to an exit and to safety.

iBeacon Guidance System

Figure 4:
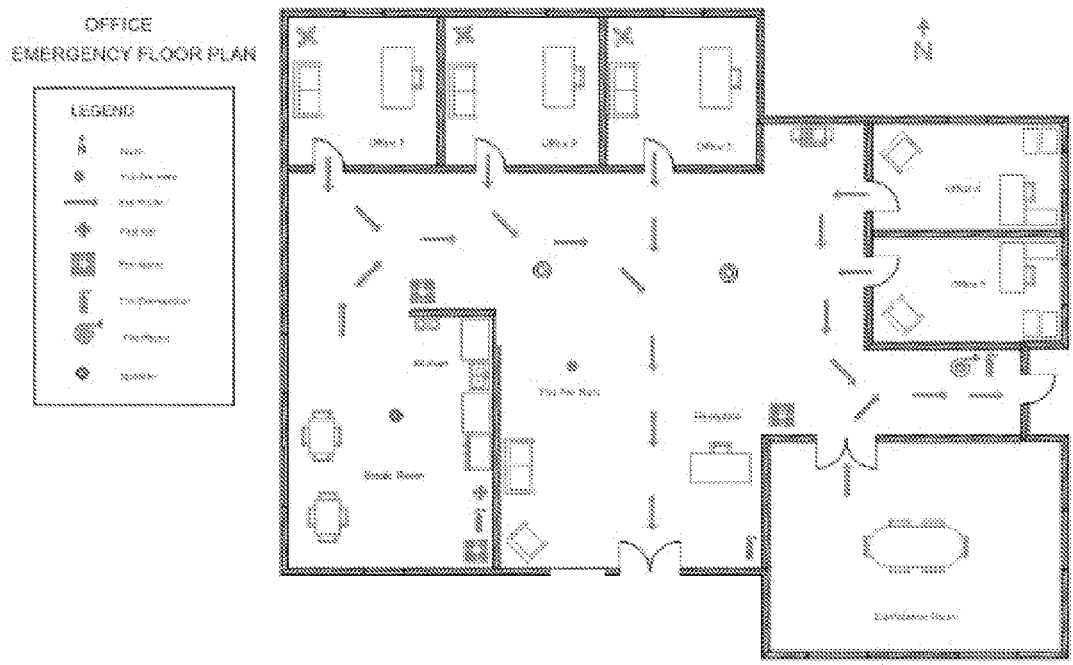
FIG. 4 is the key features.

As seen in reference to FIG. 4, the system may also be configured to utilize an iBeacon Guidance system, by Apple Inc., of Cupertino, Calif. The iBeacon Guidance system includes a plurality of Bluetooth low energy devices (BLE) that provide location information of devices along the fire exit path and may define the exit path on a virtual floor map. The user can see the fire exit paths lit up on each floor, and can also receive step-by-step navigation along the fire exit based on the proximity to a particular BLE device.

The diagram below illustrates how the iBeacon devices placed in different locations in the floor will allow the device to determine where the user needs to go. For example, if the user is close to iBeacon A, the device may tell the user to walk straight ahead. Whereas when the user is close to iBeacon B, the device would the user to proceed to the right. All via audible and user interface instructions.

iOS Platform Devices

Implementation of the SAFE system on iOS platform devices 16 utilizes Apple iBeacon technology to determine when a user 14 is close to a specific location. When the SAFE solution is deployed in a building 12, part of the installation may involve setting up iBeacon devices in strategically determined locations. These locations may then be picked up by the mobile application and will allow it to determine the exact location of the user.

Android Platform Devices

Implementation of the SAFE system on Android operating system devices and applications have the ability to determine the user's floor location using two different methods: 1. utilizing the iBeacon technology and re-using the same approach utilized by the iOS application; and 2. using the device's barometric pressure sensor and the GPS to determine the height. The second approach may utilize the following technique:

a. Acquire the device pressure using the barometric pressure sensor http://developer.android.com/reference/android/hardware/Sensor.html#TYPE_PRESSURE incorporated herein by reference.
b. Acquire the device latitude and longitude using the GPS.
c. Using a third party API, such as Forecast iOS, to acquire the current location's temperature and atmospheric pressure.
d. Use the following equation to determine the device height:

$$h = h_s + \frac{T_b}{L_s} \cdot \left[ \left(\frac{P}{P_s}\right)^{\frac{-R \cdot L_b}{S_s \cdot M}} - 1 \right]$$

Reference: http://www.mide.com/products/slamstick/air-pressure-altitude-calculator.php, incorporated herein by reference.

e. Using the building's estimated floor height to determine the floor the user is currently on.

SAFE High Frequency Audio SOS Module

In another aspect of the present invention, the mobile client application may also be configured to use the internal speakers and microphones of participating client devices 16 in order to provide a localized SOS communications with other mobile devices 16 in close proximity to the device of a distressed user 14. In this embodiment, the devices 16 will utilize high frequency audio (inaudible to the users) signals to transmit information between devices 16 in surrounding areas.

Figure 8:
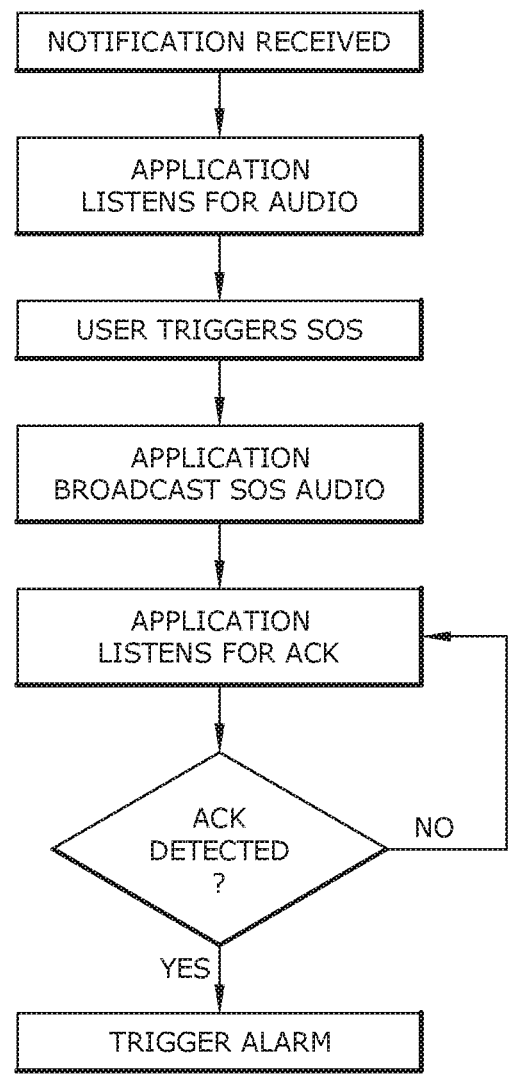
FIG. 8 is a flow chart of the safe audio system module 2.

As seen in reference to FIG. 8, when an emergency notification is received by the mobile application, the next step is to present the user 14 an interface that will easily allow them to navigate to the nearest exit. At the same time, the mobile application may also be configured activate an audio SOS module, which activates an SOS listening mode on the user's device 16. The user interface may also provide the user 14 the option to call for help via an SOS button. When a distressed user 14 activates the SOS button, the SOS system module may perform two functions.

First the SOS module may send a distress notification of the user's distress to the notification system. This will alert first responders to the presence of the distressed individual in the structure 12. If the application has been able to ascertain the distressed user's location within the structure 12, the distress notification may include an identification of the distressed user's 14 location within the structure 12.

Second, the SOS module may also broadcast a high frequency audio alert which will be audible to other nearby devices 16. The distressed user's device will then monitor for an acknowledgement from a nearby user's device. If no acknowledgement is received, the distressed user's device will continue to monitor for an acknowledgement. If the distressed user's device receives an acknowledgement from another user's device, the distressed user's device may then trigger an alarm to assist the other user in locating the distressed user. The alarm may be a human detectable audible alarm. On devices equipped with a camera flash capability, the alarm may also include a visual alarm via a repeated flashing of the camera flash.

Figure 7:
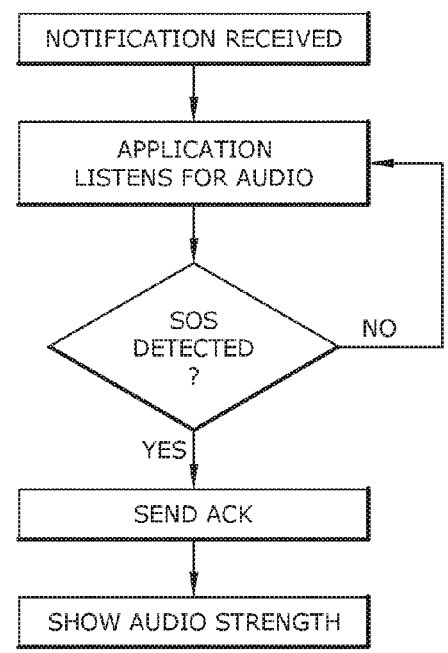
FIG. 7 is a flow chart of the safe audio system module 1.

As seen in reference to FIG. 7, devices 16 that are in an SOS listening mode and close to the distressed user, which activated the SOS stress call feature, will be able to locate and assist or provide assistance to those in need. When in the listening mode, the devices monitor for a high frequency SOS audio signal. If no SOS audio signal is detected, the application continues to monitor for the signal. If the device detects the high frequency SOS audio, it will transmit an acknowledgement to the distressed user's device. The user interface on the recipient's device may then present an audio signal strength display to provide directional guidance to the location of distressed user. For example, if a Fire Emergency team is in the building, they will be able to locate the distressed user's location by looking at the system and also by using the SAFE application which will help them narrow down the location of the user by showing the strength of the audio signal as they get closer to the distressed user.

The computer-based data processing system and method described above is for purposes of example only, and may be implemented in any type of computer system or programming or processing environment, or in a computer program, alone or in conjunction with hardware. The present invention may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the invention as set forth in the following claims.

What is claimed is:

1. A method of locating a distressed mobile device user, comprising:
   receiving a notification of an emergency condition at a specified location on a mobile device;
   monitoring for a supersonic audio signal on the mobile device;
   activating a supersonic audio SOS signal via a user interface of the mobile device of the distressed mobile device user;
   broadcasting the supersonic audio SOS signal through a device speaker of the distressed mobile device user;
   detecting the supersonic audio SOS signal on a second mobile device;
   broadcasting a supersonic audio acknowledgement of the SOS signal; and
   presenting an audio strength meter on a display screen of the second mobile device.

2. The method of claim 1, further comprising:
   presenting a directional guidance on the display screen of the second mobile device to the source of the supersonic audio SOS signal.

3. The method of claim 1, further comprising:
   receiving the supersonic audio acknowledgement of the supersonic audio SOS signal through a device microphone of the distressed mobile device user; and
   triggering a human perceptible alarm signal after receiving the acknowledgement.

4. The method of claim 3, wherein the human perceptible alarm is one or more of an audible alarm and a visual alarm.

* * * * *